Figure 1:
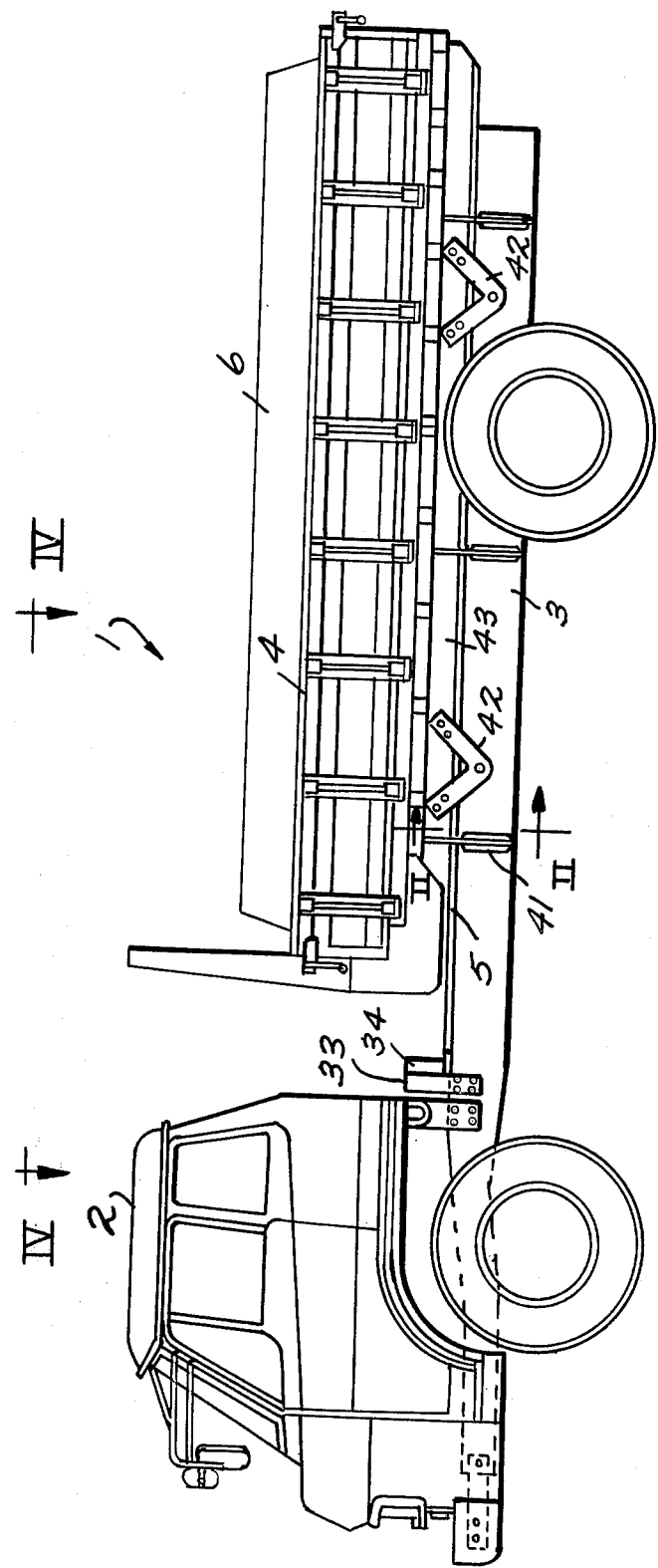

United States Patent [19]

Yamanaka et al.

[11] 3,981,530
[45] Sept. 21, 1976

[54] ENERGY ABSORBING LOADING TABLE MOUNT

[75] Inventors: Akira Yamanaka, Yokohama; Katsumi Terakado, Yamato; Naofumi Nagaike, Yokohama, all of Japan

[73] Assignee: Mitsubishi Jidosha Kogyo Kabushiki Kaisha, Tokyo, Japan

[22] Filed: Aug. 19, 1974

[21] Appl. No.: 498,854

[52] U.S. Cl. .......................... 296/35 R; 180/82 R; 180/103 A; 188/1 C; 296/28 M
[51] Int. Cl.² .................. B62D 27/06; B62D 33/02
[58] Field of Search .............. 180/82 R, 89 R, 89 A, 180/1 R, 103, 91; 280/80 B, 107; 296/35 R, 35 A, 28 M; 188/1 C

[56] References Cited
UNITED STATES PATENTS

| | | | |
|---|---|---|---|
| 2,355,528 | 8/1944 | Harper | 296/35 R |
| 2,639,187 | 5/1953 | Grumbache | 296/28 M X |
| 2,962,295 | 11/1960 | Tenenbaum | 296/35 R X |
| 3,162,479 | 12/1964 | Hewitt | 180/103 X |
| 3,175,717 | 3/1965 | Smith | 280/80 B |
| 3,381,995 | 5/1968 | Carter | 296/35 R |
| 3,463,501 | 8/1969 | Field | 296/35 R X |
| 3,493,263 | 2/1970 | Brown | 296/28 M |
| 3,672,697 | 6/1972 | Knowles | 180/82 R X |
| 3,851,722 | 12/1974 | Grosseau | 180/82 R |
| 3,861,736 | 1/1975 | Rossler | 296/28 M |

FOREIGN PATENTS OR APPLICATIONS

| | | | |
|---|---|---|---|
| 1,439,918 | 4/1966 | France | 180/89 A |
| 1,933,524 | 1/1971 | Germany | 188/1 C |
| 938,454 | 10/1963 | United Kingdom | 296/28 M |

*Primary Examiner*—M. H. Wood, Jr.
*Assistant Examiner*—John P. Silverstrim
*Attorney, Agent, or Firm*—Cushman, Darby & Cushman

[57] ABSTRACT

A truck described herein comprises a loading table mounted on a body frame of said truck in such manner that said loading table may move in the forward direction along said body frame when an impact force larger than a predetermined value is applied to a vehicle body of said truck. An energy absorber means is interposed between said body frame and said loading table for absorbing the kinetic energy possessed by said loading table. In one aspect of the invention, the truck also comprises a stopper mounted on said body frame to limit the forward motion of said loading table along said body frame, the stopper also including separate energy absorber means for absorbing the kinetic energy of said loading table. Each of said energy absorber means consists of a member which absorbs the kinetic energy through friction, elastic deformation, plastic deformation, or through their combined effect.

3 Claims, 15 Drawing Figures

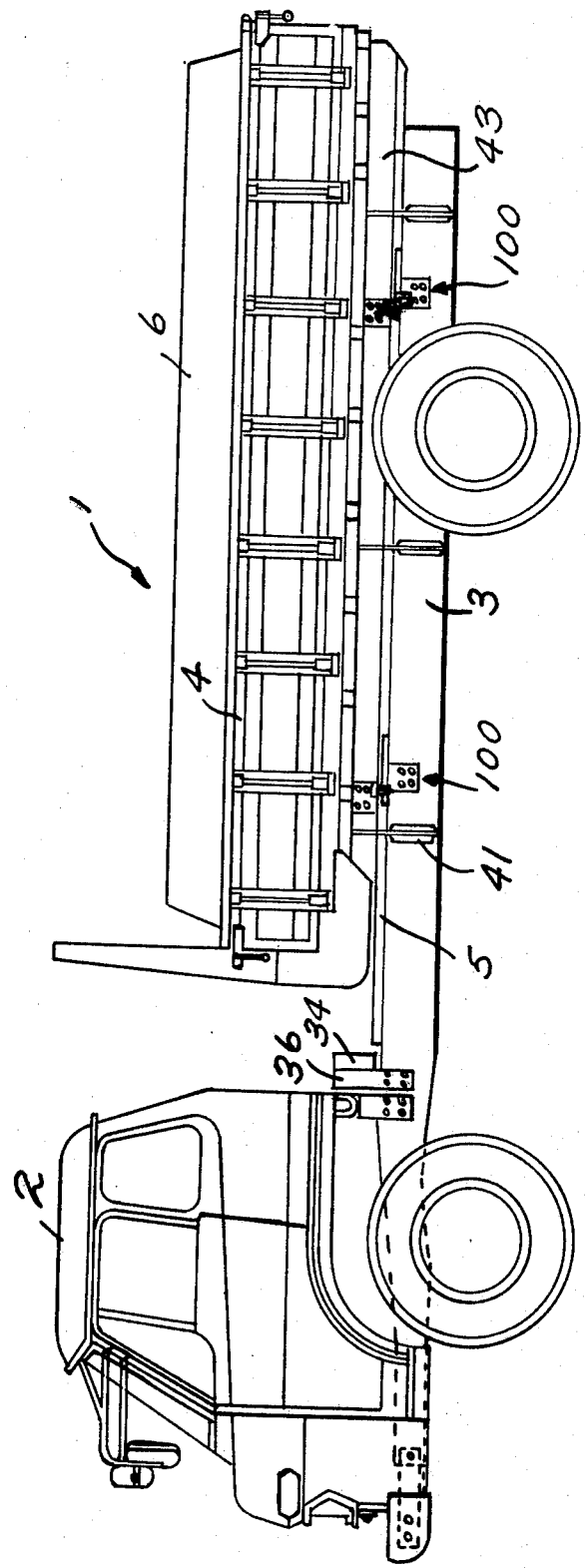

ENERGY ABSORBING LOADING TABLE MOUNT

The present invention relates to a truck in which provision is made to mitigate an impact force exerted upon riders of the truck upon collision.

Heretofore, an energy absorber for protecting riders of a truck upon its collision such as, for example, a bumper could not sufficiently absorb impact energy unless it were constructed in a larger scale than that used for passenger cars because a total vehicle weight under loaded condition of a truck is large. Furthermore, since kinetic energy is increased by a loading table and goods loaded thereon, and is large with respect to the energy absorbing capability upon impact inherent to a vehicle body frame due to its plastic deformation, G (deceleration) applied to the riders upon collision becomes large, so that energy absorbs of the prior art are quite unsatisfactory for assuring safety of the riders.

An object of the present invention is to provide a novel truck which is free from the aforementioned disadvantages in the prior art.

According to one feature of the present invention, there are provided a loading table which can move in the forward direction along a vehicle body frame when an impact force larger than a predetermined value is applied to a vehicle body and energy absorber means interposed between said vehicle body frame and said loading table for absorbing a kinetic energy possessed by said loading table. Therefore, when a truck according to the present invention collides with an obstacle or the like and the impact force becomes larger than a predetermined value, the loading table moves along the vehicle body frame in the forward direction, and a considerable part of the kinetic energy possessed by the loading table, as well as the goods loaded thereon, which occupy almost one-half of the total vehicle weight under loaded condition of the truck, can be absorbed by said energy absorber means, so that when the truck collides with the obstacle or the like, only the kinetic energy of the part of the truck exclusive of the loading table and the goods thereon, that is, only the kinetic energy of the cab, the vehicle body frame and riders is primarily applied to the obstacle. Accordingly, the kinetic energy applied to the vehicle body frame and energy mitigating means, such as bumpers provided on the vehicle body is reduced, and this kinetic energy is effectively absorbed by the energy mitigating means, so that the G applied to the riders can be considerably reduced. Thus the safety of the riders is improved. Furthermore, the kinetic energy of the loading table as well as the goods thereon moving along the vehicle body frame is effectively absorbed and the impact energy applied to the body frame is reduced, so that energy mitigating means, such as a bumper, can be made smaller than in the case of the conventional truck in which the loading table is not movable.

Above-mentioned and other features and objects of this invention will become more apparent by reference to the following description taken in conjunction with the accompanying drawings, in which:

FIG. 1 is a side view showing a first embodiment of the present invention.

Figure 2:
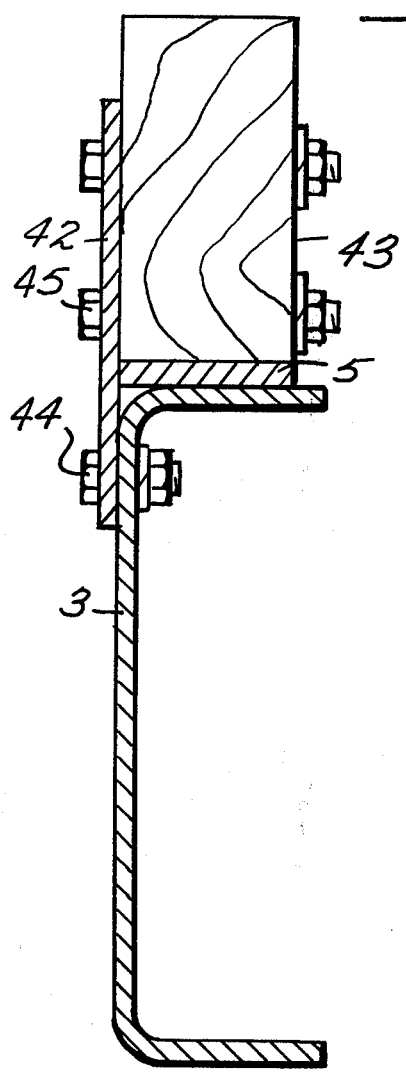
Figure 3:
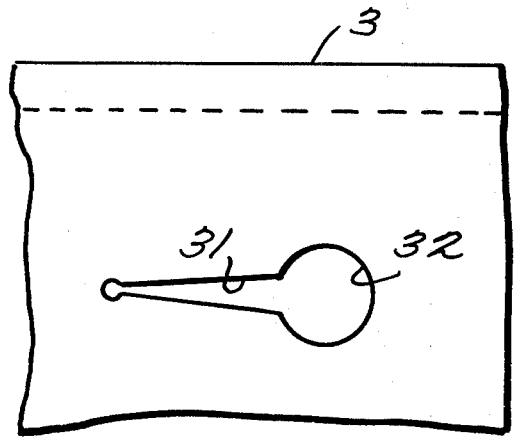
Figure 4:
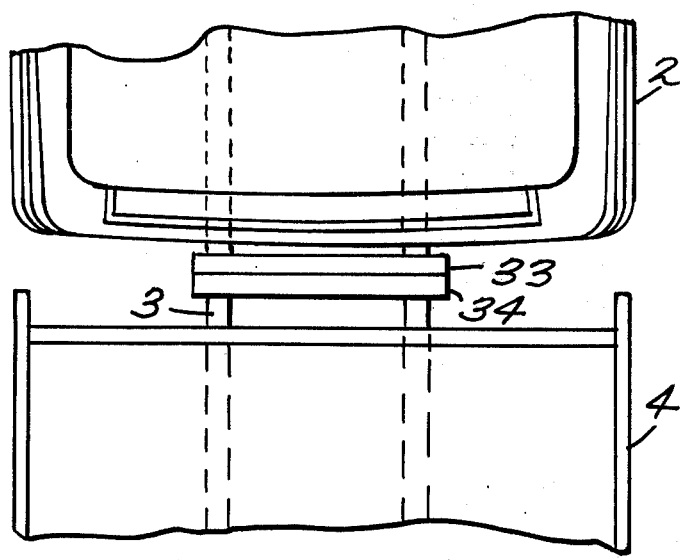
Figure 6:
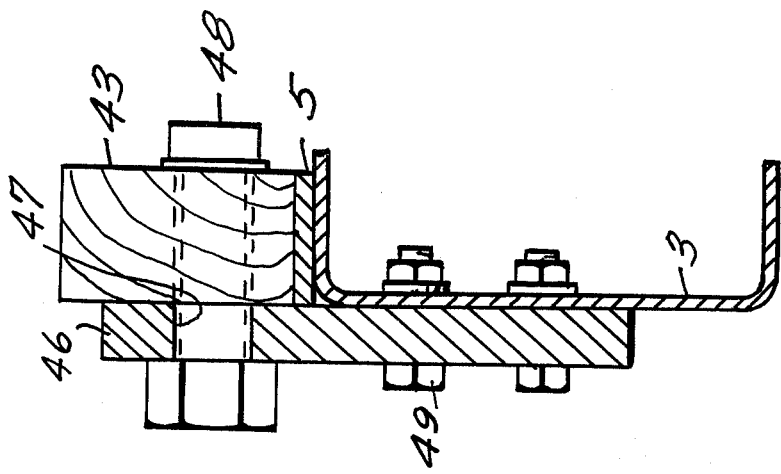
Figure 5:
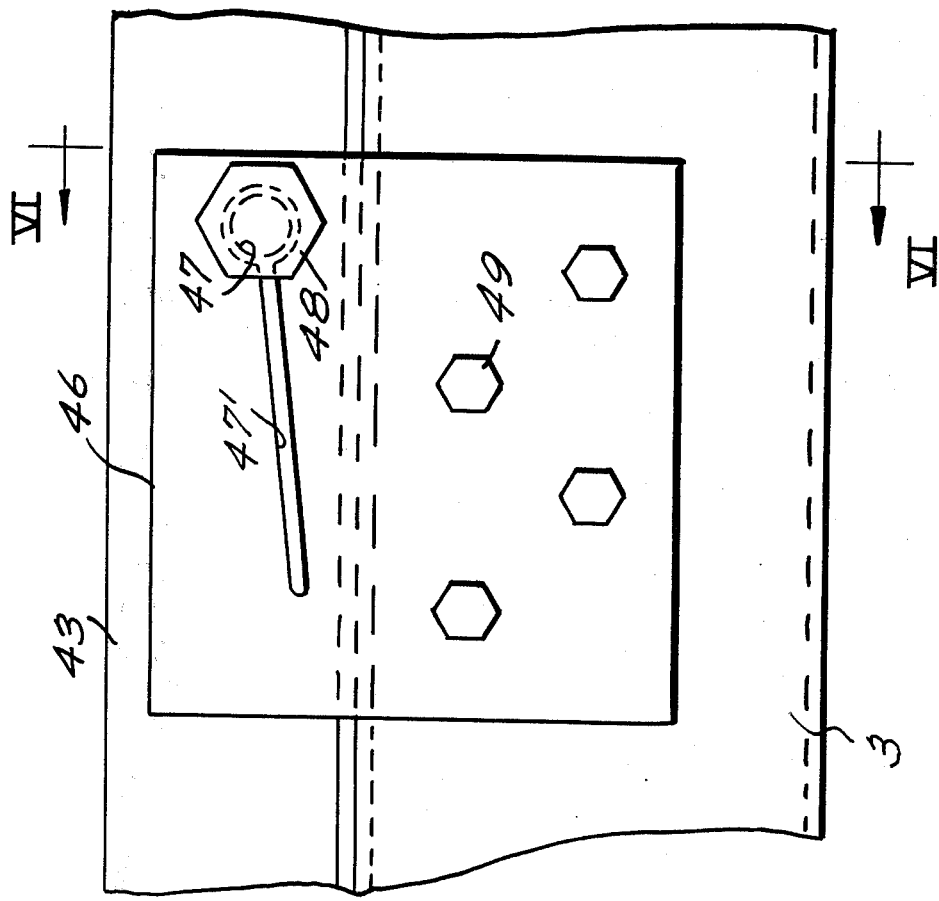
Figure 7:
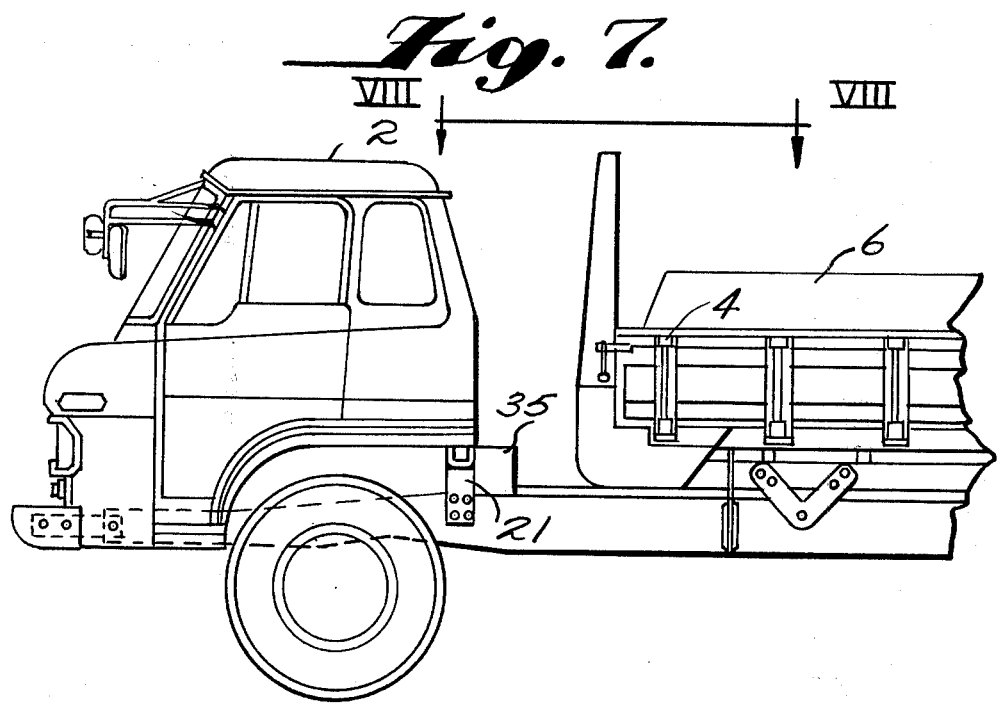
Figure 8:
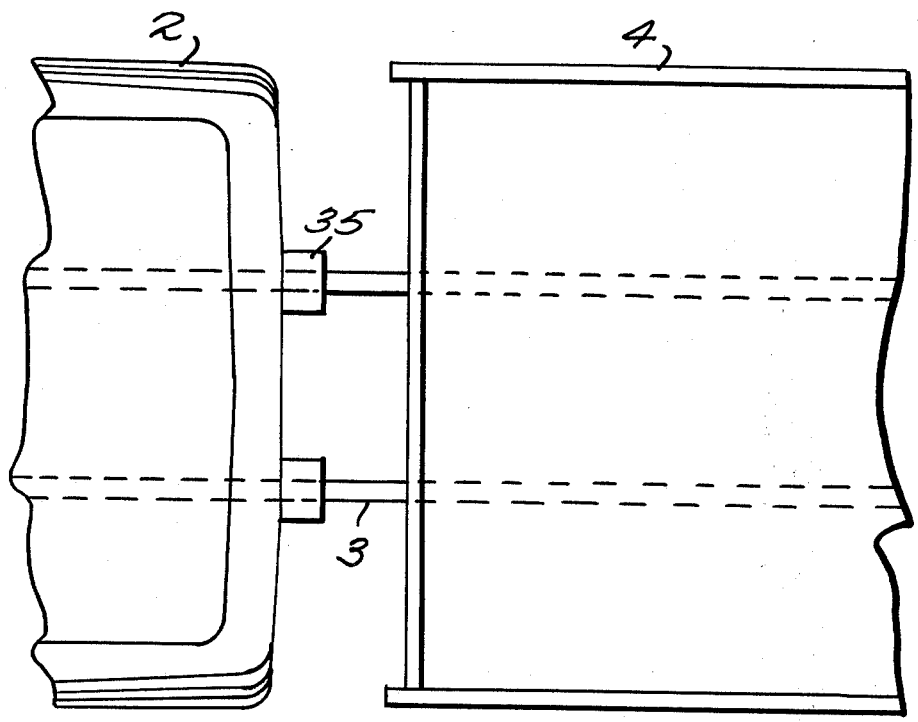
Figure 9:
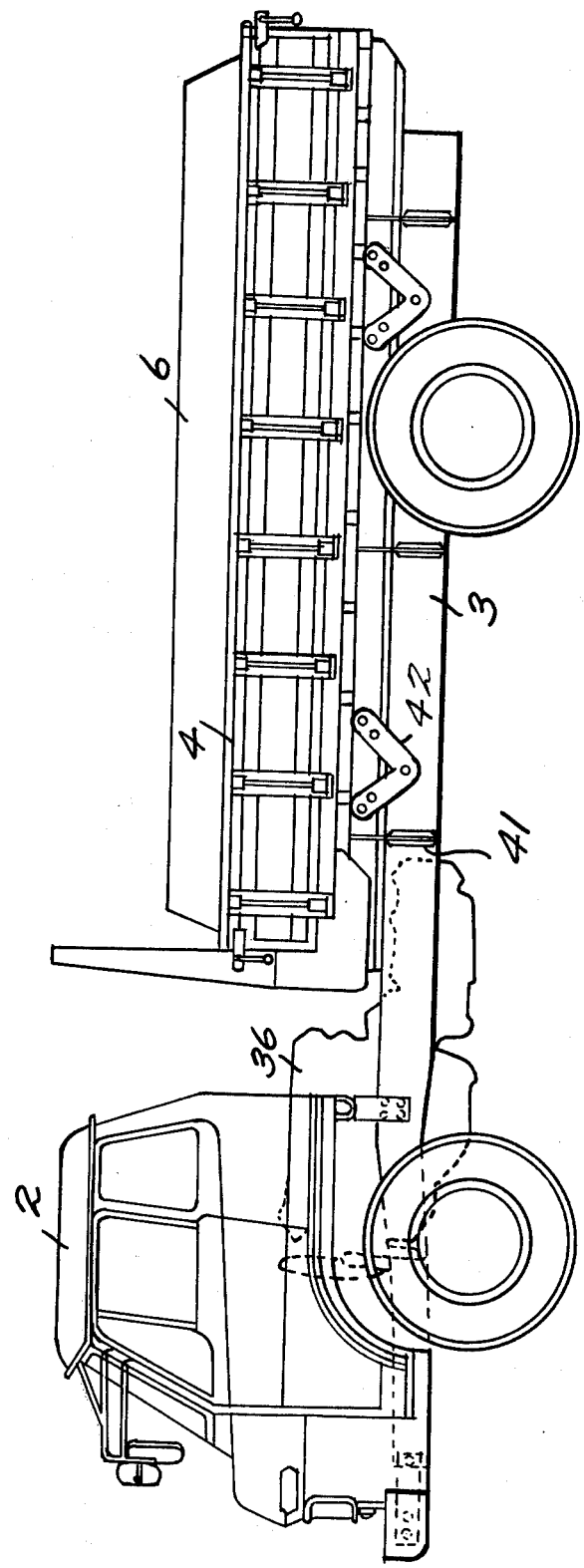
Figure 13:
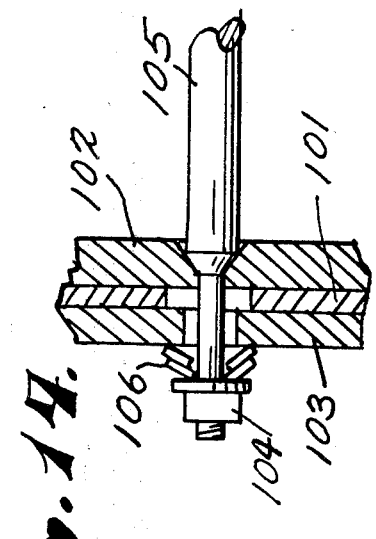
Figure 14:
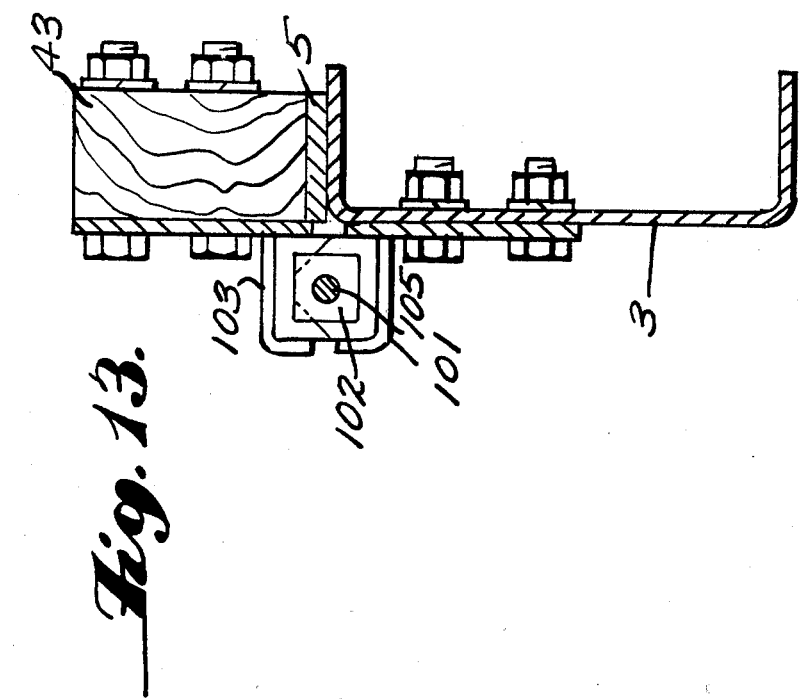
Figure 11:
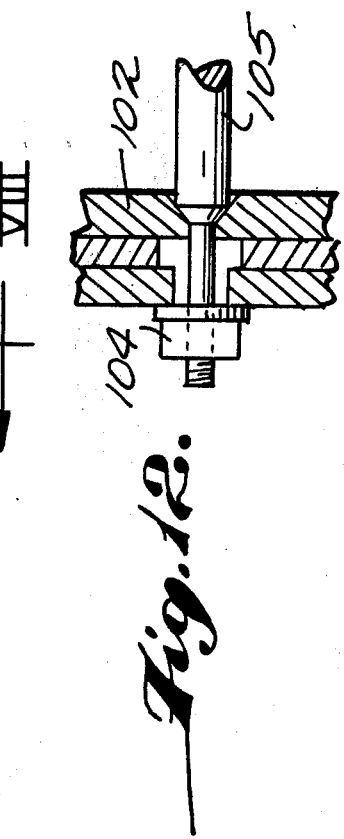
Figure 12:
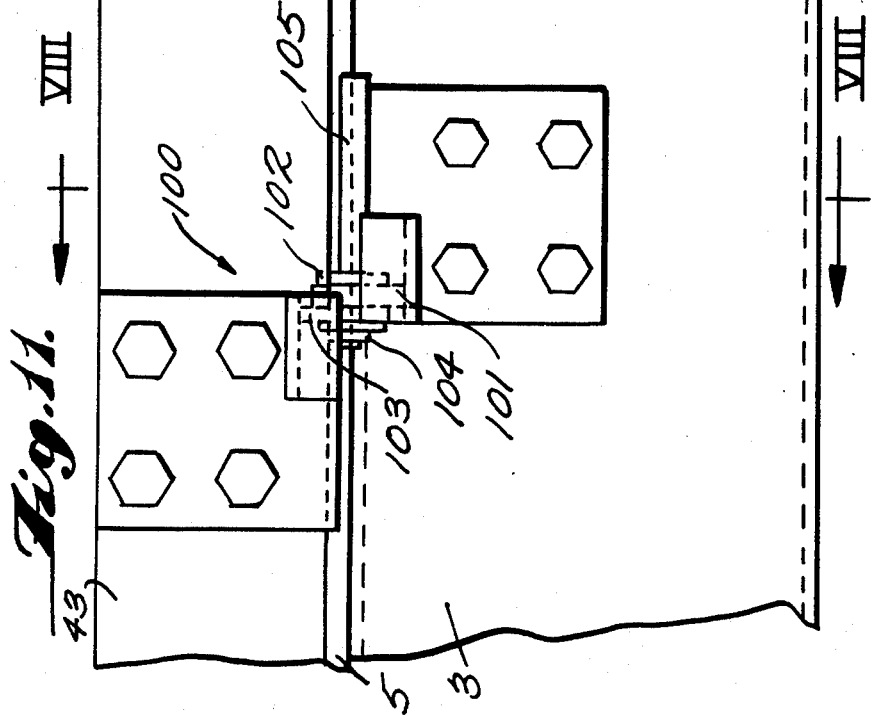
Figure 15:
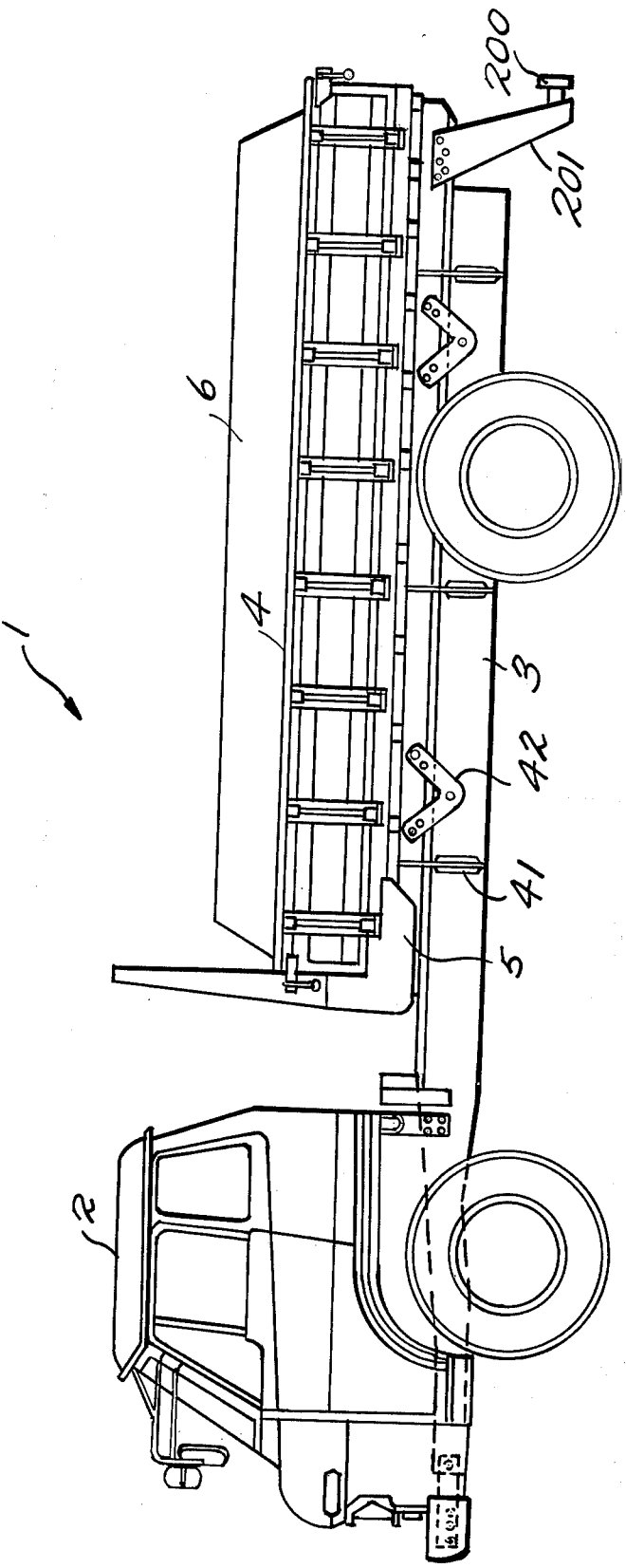

FIG. 2 is a cross-section view taken along line II — II in FIG. 1 as viewed in the direction of arrows, FIG. 3 is a cross-section view taken along line III — III in FIG. 2 as viewed in the direction of arrows, FIG. 4 is a partial plan view taken along line IV — IV in FIG. 1 as viewed in the direction of arrows, FIG. 5 shows a modification of a part of the structure shown in FIG. 1, FIG. 6 is a cross-section view taken along line VI — VI in FIG. 5 as viewed in the direction of arrows, FIG. 7 is a partial side view showing a modification of a part of the structure shown in FIG. 1, FIG. 8 is a partial plan view taken along line VIII — VIII in FIG. 7 as viewed in the direction of arrows, FIG. 9 is a side view showing a modification of the structure shown in FIG. 1, FIG. 10 is a side view showing a second embodiment of the present invention, FIG. 11 is an enlarged side view of an energy absorber shown in FIG. 10, FIG. 12 is an enlarged cross-section view of an essential part of the energy absorber in FIG. 11, FIG. 13 is a cross-section view taken along line XIII — XIII in FIG. 11 as viewed in the direction of arrows, FIG. 14 is an enlarged cross-section view of a modification of the essential part of the energy absorber shown in FIG. 12, and FIG. 15 is a side view showing a third embodiment of the present invention.

Now the present invention will be described in more detail in connection to its preferred embodiments illustrated in the accompanying drawings. Throughout the drawings, similar reference numerals designate equivalent members.

In a first embodiment illustrated in FIGS. 1 to 4, a truck 1 comprises a cab 2, a frame 3 and a loading table 4, the cab 2 being fixedly mounted on the frame 3, the frame has a stopper 33 fixedly secured onto its upper surface. The stopper 33 is provided with an energy absorbing mmember 34 consisting of a rubber member or a coil spring. The loading table 4 is mounted on the frame 3 via its floor joist 43 by means of U-bolts 41 and anti-slip members 42, the U-bolts 41 preventing the loading table 4 from moving up and down, and the anti-slip member 42 consisting of a V-shaped plate which is fastened to the floor joist 43 of the loading table 4 by means of bolts 45 and also fastened to the frame 3 by means of bolts 44 which penetrate through bolt holes 32 each associated with a horizontally elongated slot 31 the holes preventing the loading table 4 from moving in the forward or backward direction of the truck 1 under normal conditions. Friction plates 5 provided with contact surfaces having a large coefficient of friction on their upper and lower faces are interposed between the frame 3 and the loading table 4, and on the loading table 4 are loaded goods 6.

Because of the above-described construction, when the truck 1 collides with a fixed wall in front of the truck, the cab 2 and the frame 3 strike against the fixed wall, and impact forces are exerted upon the cab 2, frame 3, loading table 4 and goods 6. If the impact force exerted upon the loading table 4 and the goods 6 loaded thereon exceeds a predetermined value, then the loading table 4 loaded with the goods 6 tends to move forwardly relative to the frame 3 with a large kinetic energy. In other words, the loading table 4 moves forwardly against the resistance caused by the friction plates 5 interposed between the floor joists 43 and the frame 3 and by the anti-slip members 42. More particularly, the bolt 44 fastening the anti-slip member 42 and the frame 3 moves forwardly as it plastically deforms the elongated slot portion 31 in the frame 3, and during this movement the bolt and the slot absorb the kinetic energy of the loading table 4 loaded with the goods 6, in cooperation with the friction plates 5. If the kinetic energy is too large to be absorbed completely and the bolt 44 breaks, the loading table 4 slides forwardly along the frame 3 until the front end of the loading table 4 strikes against an energy absorbing member 34 provided at the stopper 33, whereby the impact is also mitigated.

In this connection it is to be noted that as shown in FIGS. 5 and 6, in place of the aforementioned anti-slip members 42, anti-slip members 46 for increasing frictional force, each of which is made of a rectangular metallic plate, can be fastened to the floor joist 43 of the loading table 4 and the frame 3 by means of bolts. The anti-slip member 46 for increasing frictional force is provided with a bolt hole 47 at the right end of the portion brought in contact with the side surface of the floor joist 43, and also with a slot 47' tilting in the leftward and downward direction starting from the bolt hole 47. A bolt 48 extends through the bolt hole 47 and a bolt hole provided in the floor joint 43 to couple the anti-slip member 46 and the floor joist 43, and the portion of the anti-slip member 46 on the side of the frame 3 is fastened to the frame 3 by means of four bolts 49.

Accordingly, when an impact force exceeding a predetermined value is applied to the loading table 4 and the goods 6, the loading table 4 moves forwardly against a resistance force caused by the friction plates 5 and the anti-slip member 46, and during this movement, the bolt 48 that is integrally coupled to the loading table 4 shifts leftwardly starting from the bolt hole 47 and moving along the downwardly inclined slot 47' through plastic deformation, so that the bolt 48 and the slot 47' in combination more strongly press the friction plates 5 towards the frame 3, resulting in increase of the frictional force exerted by the friction plates 5. Accordingly, the kinetic energy of the loading table 4 is be absorbed to a greater extent than in the case of providing only the anti-slip members 42 as described previously.

Instead of the above-described stopper 33 and the energy absorbing member 34, a plastically deformable energy absorbing member 35, consisting of a metallic honeycomb structure or a synthetic resin body which is fixedly secured to a cab-mount 21, can be used as shown in FIGS. 7 and 8.

Still further, it is also possible to mount an engine 36 in such manner that its rear end may be located rearwardly of the cabin 2 and above the frame 3, as shown in FIG. 9, whereby rather than providing the aforementioned stopper 33 and the like, the loading table 4 slides along the frame 3 upon collision of the vehicle body until its front end strikes against the engine 36, and produces a buffer effect.

Accordingly, when the truck 1 strikes against a fixed wall, at first only the kinetic energy possessed by the cab 2, frame 3 and riders sitting in the cab 2 is applied to the fixed wall, resulting in damage of the cab 2 and frame 3. However, since the kinetic energy possessed by the loading table 4 and goods 6 loaded thereon, which occupy more than one-half of the total vehicle weight under loaded condition, is not immediately applied to the fixed wall, the kinetic energy of the cab 2 and frame 3 is effectively absorbed by their plastic deformation upon collision. Therefore, the G applied to the riders upon collision is smaller than that in the case where the full weight of the truck 1 is involved. Since the kinetic energy of the loading table 4 moving forwardly along the frame 3 is absorbed over an extended time period by the friction plates 5, anti-slide members 42 and energy absorbing member 34 or 35, the kinetic energy applied to the fixed wall by the intermediary of the frame 3 is reduced. Also when the truck 1 collides with another vehicle rather than a fixed wall, the kinetic energy of the loading table 4 and goods 6 loaded thereon, which occupy more than one-half of the total vehicle weight under loaded condition, is absorbed by the friction plates 5, anti-slip members 42 and energy absorbing members 34, and thus all of the kinetic energy of the full vehicle weight is not instantaneously transmitted to the other vehicle, so that the acceleration applied to said another vehicle is reduced.

Referring now to FIGS. 10 to 14 which illustrate a second embodiment of the present invention, an energy absorber 100 comprises a die 102 supported by a bracket 101 which is in turn fixed to the frame 3 by fastening with bolts, and a metallic rod 105 having its smaller diameter portion near to its front end inserted into a hole formed at the center of said die 102 and fastened with a nut 104 to another bracket 103 which is in turn fixed to the floor joist 43 of the loading table 4 by fastening with bolts at its front end portion. In a modified embodiment shown in FIG. 14, dish springs 106 are interposed between the bracket 103 and the nut 104 to achieve a buffer effect.

Accordingly, upon collision of the vehicle body, if the loading table 4 is moved forwardly relative to the frame 3 by an impact force exceeding a predetermined value, then the larger diameter portion of the metallic rod 105, which is fixedly secured to the loading table side at its front smaller diameter portion, is drawn as it is subjected to plastic deformation caused by the die 102 being fixedly secured to the frame. Consequently, the kinetic energy possessed by the loading table 4 and goods 6 loaded thereon is absorbed. In the case of the structure shown in FIG. 12, when the loading table 4 is moved by an impact, the larger diameter portion of the metallic rod 105 is plastically deformed immediately, and since the resistance against this plastic deformation is considerably large, the initial impact force on the frame side, that is, the initial impact force exerted upon the riders in the cab 2 is fairly large. However, in the case of the modified structure shown in FIG. 14, the initial impact force can be mitigated because the dish springs 106 are provided.

In a third embodiment of the present invention illustrated in FIG. 15, a truck 1 comprises a cab 2, a frame 3, a loading table 4, friction plates 5, shear plates 42 and a rear bumper 200. The cab 2 is fixedly secured to the frame 3. The friction plates 5 are fixedly secured to the frame 3. The loading table 4 is placed on the friction plates 5 and is inhibited from moving in the up and down directions by means of U-bolts. The shear plates 42 are adapted to be sheared when an impact force exceeding a predetermined value is applied to the loading table 4, and the rear bumper 200 is fixedly mounted to the loading table 4 via a bumper stay 201.

Owing to the above-described construction, when another vehicle strikes against the rear bumper 200 and an impact force exceeding a predetermined value is applied to the loading table 4 to which the rear bumper 200 is fixedly mounted, the shear plates 42 are sheared, so that the loading table 4 is moved forwardly along the friction plates 5 as a result the kinetic energy of the loading table 4 is absorbed by the friction between the friction plates 5 and the loading table 4.

Since the kinetic energy applied to the rear bumper 200 by another vehicle is absorbed by the friction between the friction plates 5 and the loading table 4, the impact force applied to the riders sitting in the cab 2 is mitigated.

In the above-described embodiments, the truck 1 was described and illustrated as a cab-over type of truck. However, the present invention is also applicable to a bonnet type of truck with equal effects and advantages.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A truck comprising:

a body frame;

a loading table positioned on said frame;

energy absorber means operatively related to said frame and the table, said energy absorber means including friction plates interposed between said body frame and said loading table and means for joining said table to the frame, said joining means comprising metallic plates each having a lower portion secured to said body frame and an upper portion drilled with at least one bolt hole adapted to receive a bolt to secure the plate to said loading table, each plate being formed with a slot extending from one of said bolt holes in the forward direction and having a width smaller than a diameter of said bolt hole, said joining means being responsive to a force on said table in excess of a predetermined value for permitting movement of the table with respect to the frame whereby kinetic energy of said moving table is absorbed by said energy absorber means.

2. A truck according to claim 1, wherein said slot also is inclined downwardly.

3. A truck comprising:

a body frame;

a loading table positioned on said frame;

energy absorber means operatively related to said frame and the table, said energy absorber means including means for joining said table to the frame, said joining means comprising a plate through which fastening bolts extend to connect said body frame and said loading table to prevent slip therebetween, said plate having at least one slot for receiving a bolt, said joining means being responsive to a force on said table in excess of a predetermined value for permitting movement of the table with respect to the frame whereby said bolt expands said slot resulting in plastic deformation of the plate and absorption of kinetic energy of said moving table.

* * * * *